(12) United States Patent
Rose

(10) Patent No.: US 10,978,212 B1
(45) Date of Patent: Apr. 13, 2021

(54) SYSTEM AND METHOD FOR CONSOLIDATING USED NUCLEAR FUEL

(71) Applicant: National Technology & Engineering Solutions of Sandia, LLC, Albuquerque, NM (US)

(72) Inventor: Scott E. Rose, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 465 days.

(21) Appl. No.: 15/872,439

(22) Filed: Jan. 16, 2018

(51) Int. Cl.
| | |
|---|---|
| *G21C 19/34* | (2006.01) |
| *G21C 19/32* | (2006.01) |
| *G21C 19/375* | (2006.01) |
| *G21C 19/105* | (2006.01) |
| *G21C 19/36* | (2006.01) |
| *G21C 19/20* | (2006.01) |

(52) U.S. Cl.
CPC ........... *G21C 19/34* (2013.01); *G21C 19/105* (2013.01); *G21C 19/207* (2013.01); *G21C 19/32* (2013.01); *G21C 19/36* (2013.01); *G21C 19/375* (2013.01)

(58) Field of Classification Search
CPC ........ G21C 19/32; G21C 19/34; G21C 19/36; G21C 19/375; G21C 19/10; G21C 19/105; G21C 19/11; G21C 19/115; G21C 19/20; G21C 19/207
See application file for complete search history.

(56) References Cited

U.S. PATENT DOCUMENTS

| | | | | |
|---|---|---|---|---|
| 4,441,242 A | * | 4/1984 | Hicken | G21C 19/06 376/261 |
| 4,619,808 A | * | 10/1986 | Formanek | G21C 19/34 250/507.1 |
| 4,638,543 A | * | 1/1987 | Shallenberger | G21C 3/334 29/426.5 |
| 4,650,640 A | * | 3/1987 | Lahr | G21C 19/32 29/723 |
| 4,659,536 A | * | 4/1987 | Baudro | G21C 19/34 29/723 |
| 4,683,110 A | * | 7/1987 | Baudro | G21C 19/36 206/443 |
| 4,687,245 A | * | 8/1987 | Formanek | G21C 19/34 294/131 |
| 4,731,219 A | * | 3/1988 | Beneck | G21C 19/34 376/261 |
| 4,889,680 A | * | 12/1989 | Wachter | G21C 19/34 376/261 |
| 4,952,072 A | * | 8/1990 | Ellingson | G21C 19/34 376/261 |
| 5,098,644 A | * | 3/1992 | McDaniels | G21C 19/32 376/261 |

(Continued)

OTHER PUBLICATIONS

American Nuclear Society, Design Criteria for Consolidation of LWR Spent Fuel, ANSI/ANS-57.10-1996 R2006.

(Continued)

*Primary Examiner* — Sharon M Davis
(74) *Attorney, Agent, or Firm* — Daniel J. Jenkins

(57) ABSTRACT

A system and method for consolidating used nuclear fuel rods using tools operably suspendable in a recess containing the used nuclear fuel rods. The systems and methods safely consolidate the used nuclear fuel rods in containers.

17 Claims, 13 Drawing Sheets

(56) References Cited

U.S. PATENT DOCUMENTS 6,459,749 B1 * 10/2002 Cho ...................... G21C 3/335
294/906

OTHER PUBLICATIONS

W. J. Bailey. 1985. Status of Rod Consolidation. PNL-5122, Pacific Northwest Laboratory, Richland, Washington.
Klein. Mar. 1986. Wet Storage in the USA, Pacific Northwest Laboratory, Richland, Washington.
International Atomic Energy Agency, Status of LWR Rod Consolidation for Storage Purposes: Concerns, Issues and Trends, IAEA-TECDOC-360, Vienna (1985).
International Atomic Energy Agency, Consolidation of Spent Fuel Rods From LWRs, IAEA, Vienna, 1992, IAEA-TECDOC-679 ISSN 1011-4289.

* cited by examiner

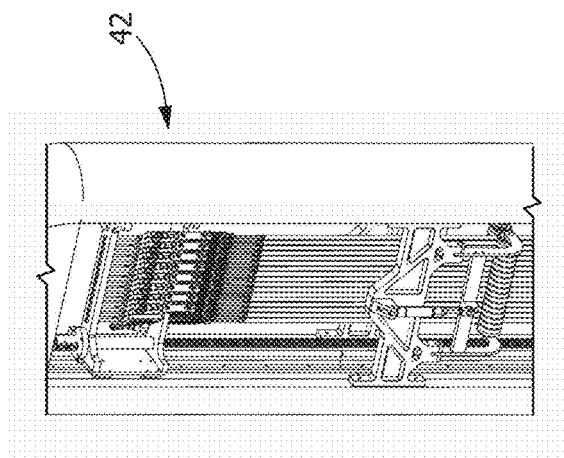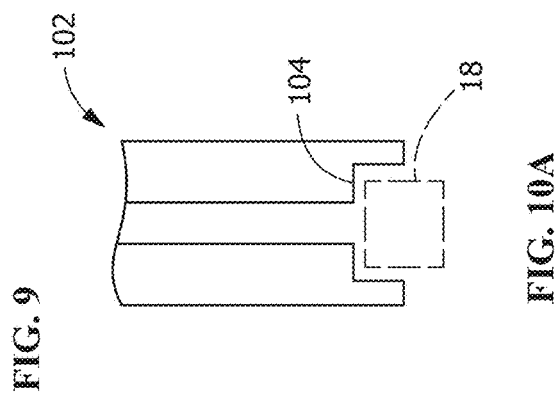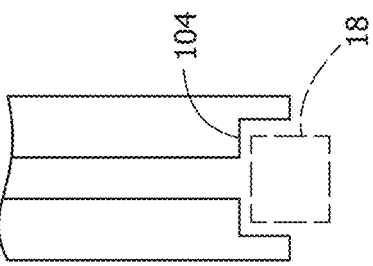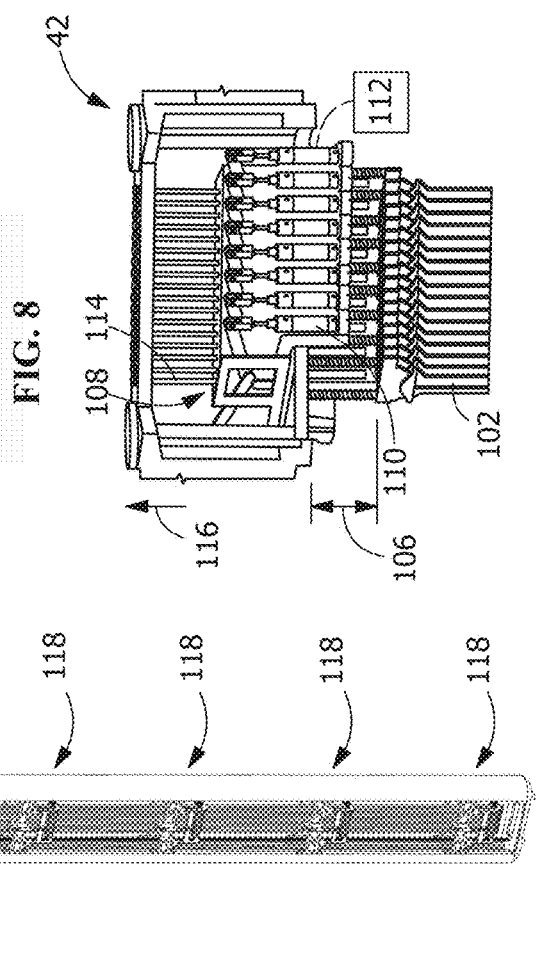
FIG. 9
FIG. 10A
FIG. 8
FIG. 10
FIG. 7

U.S. 10,978,212 B1

SYSTEM AND METHOD FOR CONSOLIDATING USED NUCLEAR FUEL

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention is directed to a system and method for consolidating used nuclear fuel.

BACKGROUND OF THE INVENTION

Storage and disposal of spent or used nuclear fuel is an ongoing concern for nuclear utilities. Currently, nuclear utilities are placing used nuclear fuel rods in dry storage canisters for on-site storage. The canister designs have evolved over the years into a small, high-capacity storage canister that minimizes impact on power production, such as reduced loading, lifting, transport activities, while holding more used nuclear fuel rods.

Containers are being designed to permit interim on-site storage, transportation, and ultimate disposal/long-term storage in a repository. However, it will be necessary to break down and consolidate nuclear fuel assemblies. That is, non-fuel bearing components (i.e. structural components) must be separated from used nuclear fuel rods to permit high-density packaging of the fuel rods in the containers. There is a need for a system and method for safely consolidating the used nuclear fuel rods in such containers at a sufficient output rate in order for such consolidating to be viable.

SUMMARY OF THE INVENTION

The disclosure is directed to a system for supporting used nuclear fuel, includes a structure securable in a recess adjacent a fuel assembly containing used nuclear fuel rods, the fuel assembly having a top nozzle assembly. The system provides an elongated top nozzle assembly removal tool operably suspendable from a drive source for removing the top nozzle assembly from the fuel assembly, exposing ends of the used nuclear fuel rods facing the drive source. The system provides an elongated tube cutter tool having a plurality of cutters operably suspendable from the drive source for cutting and removing a predetermined segment of corresponding tubes in the fuel assembly. The system provides an elongated rod extraction gripping tool having a frame having a longitudinal axis and a gripper array assembly selectively movable along the axis relative to the frame for selectively engaging ends of a row of used nuclear fuel rods, the rod extraction gripping tool operably suspendable from the drive source for removing the row of used nuclear fuel rods from the fuel assembly. The system provides an accumulator for selectively laterally arranging the row of used nuclear fuel rods therein, and an elongated second rod gripping tool operably suspendable from the drive source for moving at least one used nuclear fuel rod of the selectively laterally arranged row of used nuclear fuel rods from the accumulator to a consolidation canister for receiving the at least one used nuclear fuel rod therein.

The disclosure is also directed to a rod extraction gripping tool includes an elongated frame having a longitudinal axis and a gripper array assembly selectively movable along the axis relative to the frame for selectively engaging ends of a row of used nuclear fuel rods contained in a fuel assembly, the rod extraction gripping tool operably suspendable from a drive source for removing the row of used nuclear fuel rods from the fuel assembly. The rod extraction gripping tool provides the gripper array assembly tool having a plurality of grippers, each gripper independently having a predetermined float length along the axis capable of gripping an end of a corresponding used nuclear fuel rod of the row of used nuclear fuel rods, each of the used nuclear fuel rods capable of having a length differential relative to another used nuclear fuel rod, the length differential equal to or less than the predetermined float length.

The disclosure is yet further directed to a method for consolidating used nuclear fuel, includes securing a structure in a recess for supporting a fuel assembly containing used nuclear fuel rods therein, the fuel assembly having a top nozzle assembly. The method further provides suspendably removing the top nozzle assembly from the fuel assembly with an elongated top nozzle assembly removal tool, exposing ends of the used nuclear fuel rods facing the drive source. The method further provides suspendably cutting and removing a predetermined segment of corresponding tubes in the fuel assembly with an elongated tube cutter tool having a plurality of cutter. The method further provides suspendably removing a row of used nuclear fuel rods from the fuel assembly with an elongated rod extraction gripping tool. The method further provides selectively laterally arranging the row of used nuclear fuel rods in an accumulator, and suspendably moving the selectively laterally arranged used nuclear fuel rods from the accumulator to a consolidation canister for receiving the selectively laterally arranged used nuclear fuel rods therein.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 7 is an upper perspective view of an exemplary rod extraction gripping tool according to an embodiment of the present invention.

FIG. 8 is an enlarged, partial view of the rod extraction gripping tool of FIG. 7 in an intermediate position according to an embodiment of the present invention.

FIG. 9 is an enlarged, partial view of the rod extraction gripping tool of FIG. 7 in a retracted position according to and embodiment of the present invention.

FIG. 10 is an enlarged, partial view rotated about a vertical axis of the rod extraction gripping tool of FIG. 7 according to an embodiment of the present invention.

FIG. 10A is an enlarged, partial elevation view of an exemplary gripper of the rod extraction gripping tool of FIG. 10 according to an embodiment of the present invention.

Wherever possible, the same reference numbers will be used throughout the drawings to represent the same parts.

DETAILED DESCRIPTION OF THE INVENTION

The system of the present invention provides benefits, such as safely consolidating used nuclear fuel rods placed in a recess by maintaining a predetermined spacing from the top of the recess such as a liquid filled recess, such as a pool, for the fuel rods at all times during the consolidation process. In one embodiment, the consolidation process is an automated process, utilizing one or more driving sources, such as a robotic arm, permitting fast, efficient processing of the fuel rods. The system and method of the present invention permits the consolidation of multiple used nuclear fuel rods, such as a full row of an array of fuel rods, resulting in the ability to achieve an increased rate of fuel rod consolidation. The system of the present invention may be adapted for use with multiple fuel types, such as 17×17 fuel assemblies commonly used with pressurized water reactors, although the system and method may be utilized in other types of nuclear facilities such as boiling water reactors.

For purposes herein, the terms "used nuclear fuel rods," "nuclear fuel rods," "fuel rods," and the like may be used interchangeably.

Figure 1:
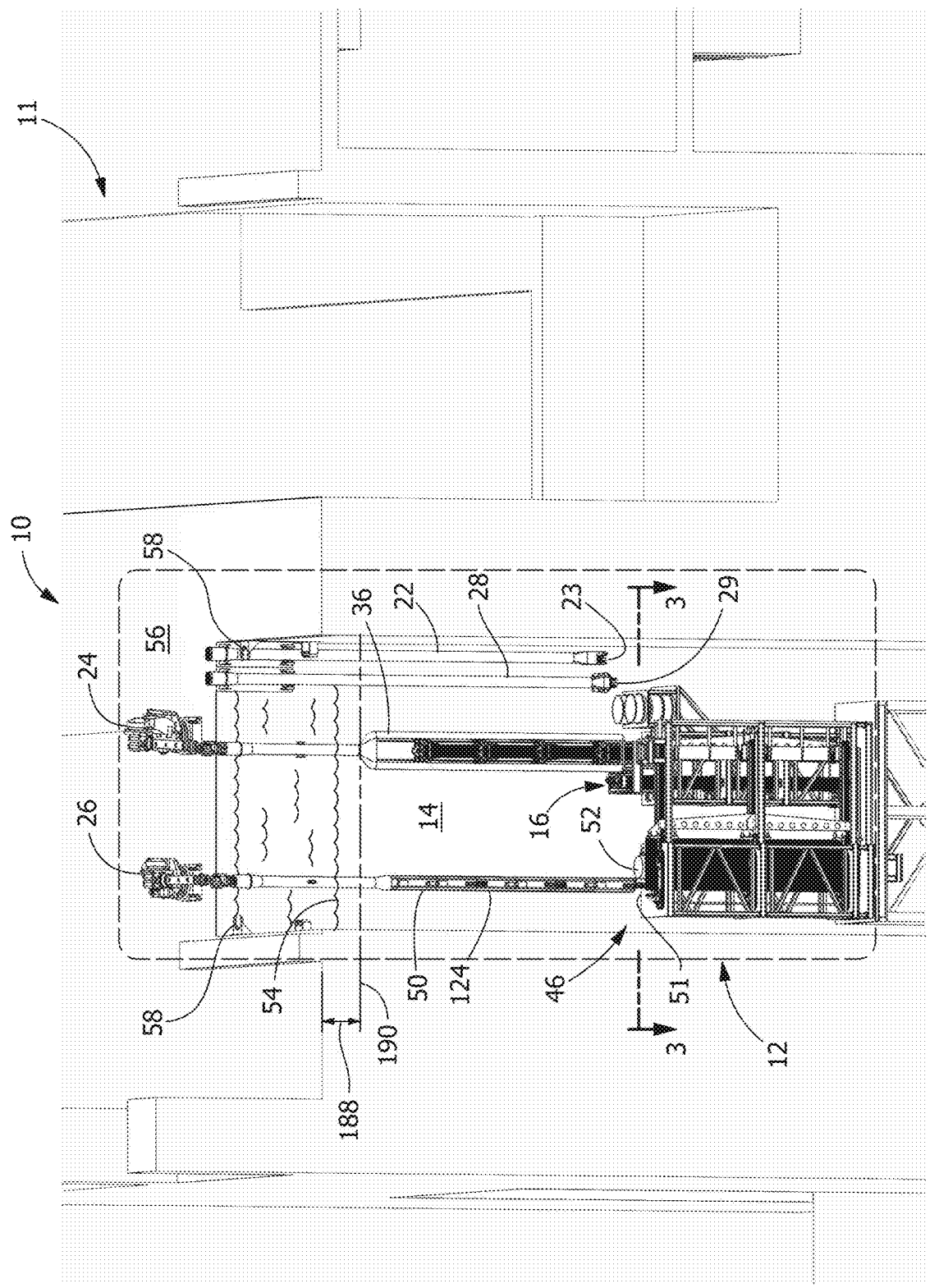
FIG. 1 shows an upper perspective view of an exemplary system for consolidating used nuclear fuel according to an embodiment of the present invention.

FIG. 1 shows a system 10 for consolidating used nuclear fuel rods. The system 10 is shown in a facility 11. As shown, fuel assemblies 16 (four fuel assemblies shown in FIG. 3) containing used nuclear fuel rods 18 (see FIGS. 2 and 3) are supported by a structure 12 in a recess 14 in facility 11. As shown, recess 14 is substantially filled with a liquid, such as water having a liquid surface 54 in close proximity to a support surface 56, with structure 12 and fuel assemblies 16 being submerged in the liquid. Fuel assemblies 16 include a top nozzle assembly 20 secured to the top of the fuel assembly structure. Three top nozzle assemblies 20 are shown in FIG. 3, with a top nozzle assembly 20 removed from the fourth fuel assembly 16, exposing the ends of rows 44 of fuel rods.

Figure 2:
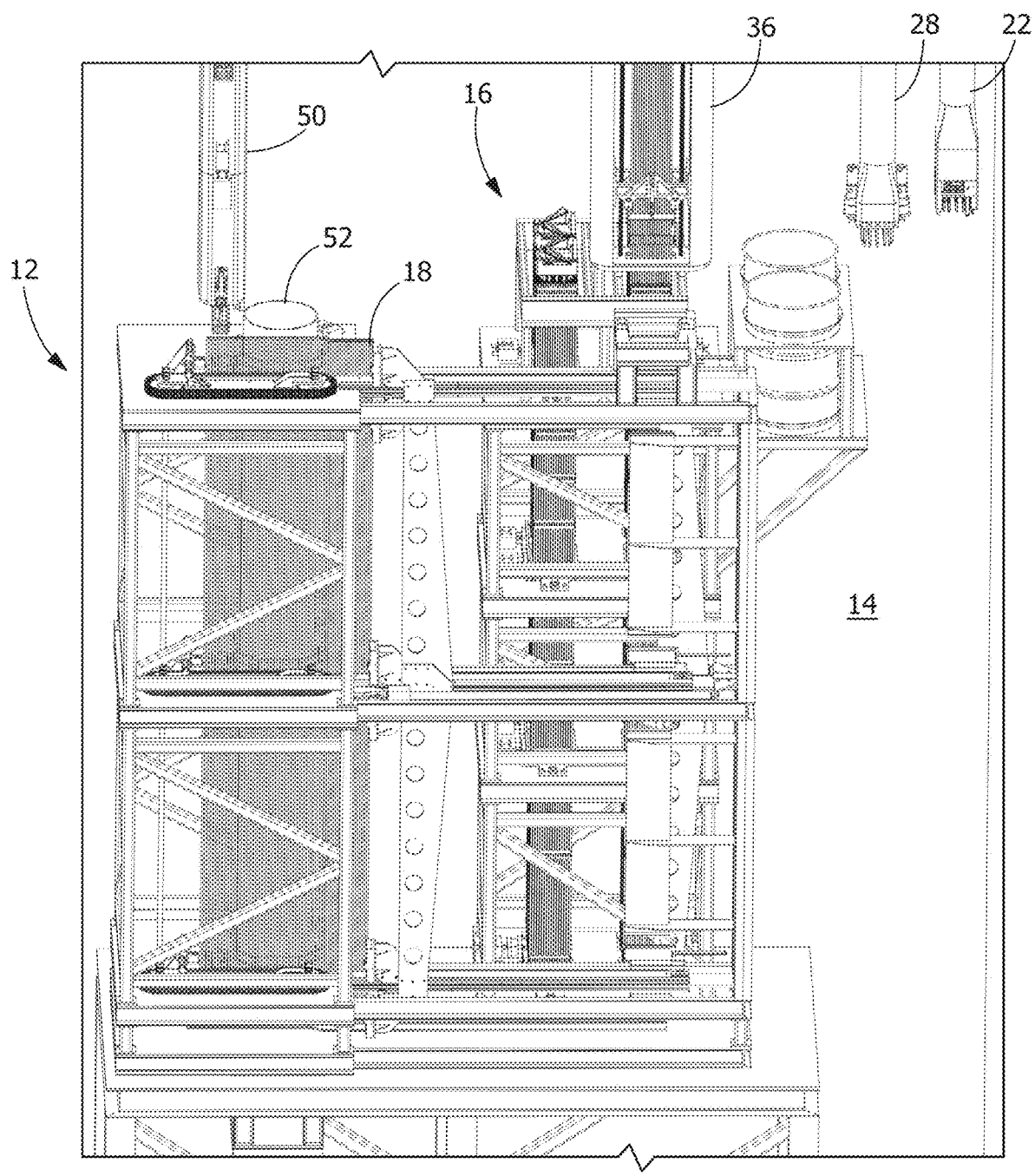
FIG. 2 is an enlarged, partial portion of the system of FIG. 1 according to an embodiment of the present invention.
Figure 3:
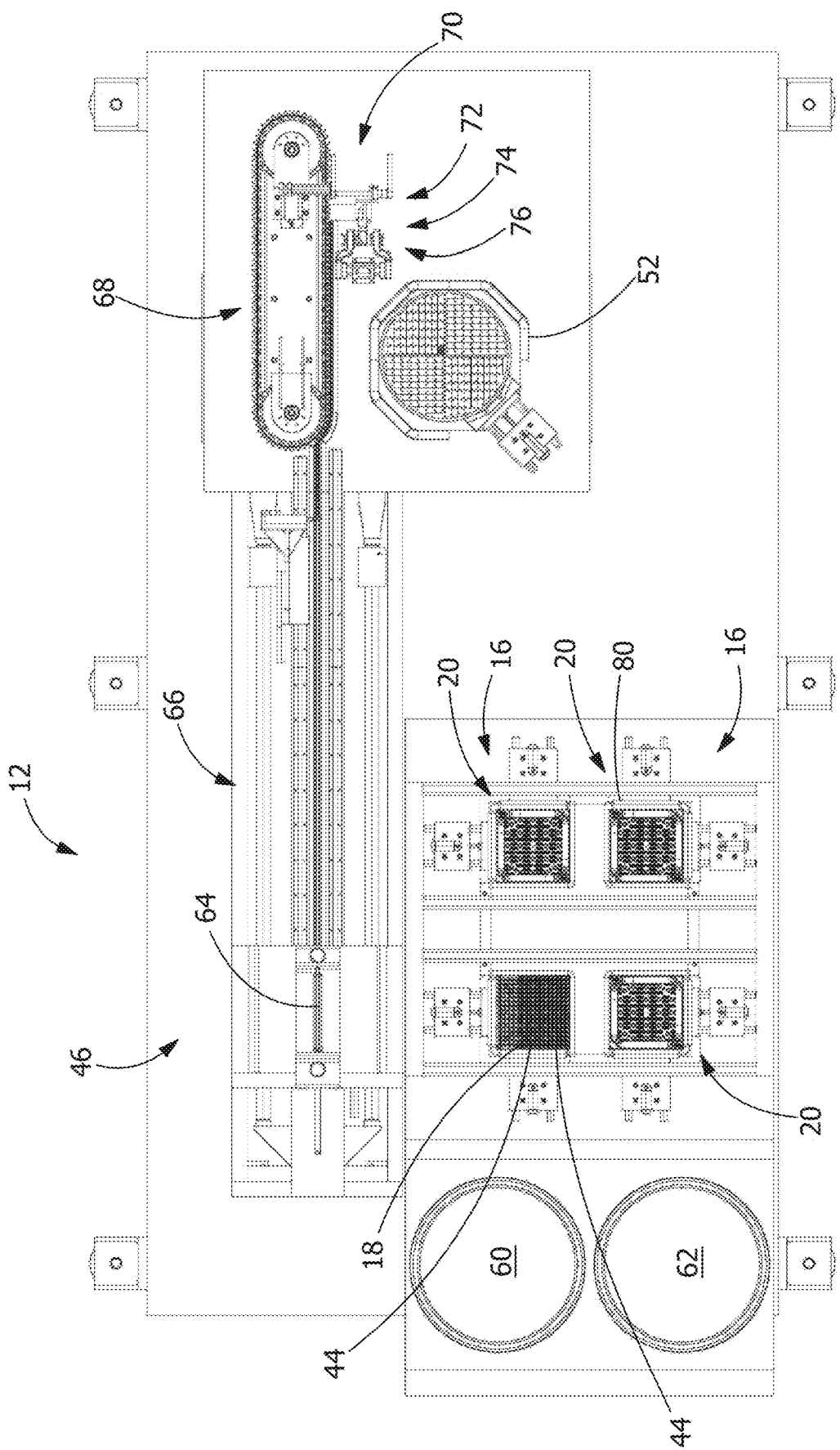
FIG. 3 is a view taken along line 3-3 of the system of FIG. 1 according to an embodiment of the present invention.

As further shown in FIG. 1, a drive source 24 such as a robotic arm or robot that may be supported by support surface 56 may utilize tools that are selectively operably suspendable from the robot to achieve consolidation of the fuel rods 18 (FIG. 2). In one embodiment, the system 10 may utilize multiple drive sources, such as a second drive source 26 such as a robot. Exemplary tools include a top nozzle assembly removal tool 22, a tube cutter tool 28, a rod extraction gripping tool 36 and a rod gripping tool 50. Secured at the edges of recess 14 are docking stations 58 for each of the tools. When the system requires a specific tool, drive source 24 utilizes a standard "quick disconnect" connector (not shown) to selectively engage an end of the tool, after which the tool is operably suspendable from the robot during use, and then returned to its respective docking station 58.

The system of the present invention, such as shown in FIG. 1, maintains a vertical separation 188 between a support surface 56 and a reference surface 190 in recess 14, depending upon the application. As a result of the vertical separation, the fuel rods 18 are always maintained vertically beneath reference surface 190 and continuously immersed beneath the surface 54 of liquid contained in recess 14. In one embodiment, the microprocessor controlled system may be automated to minimize human exposure to the fuel rods during the consolidation process.

As used herein, the term "operably suspendable" and the like means that the elongated tools utilized by the drive source remain in a generally vertical position during use. That is, once a tool such as an end of the tool is operably connected to the drive source, during operation of the drive source, the orientation of the longitudinal axis of the elongated tool dangles from the drive source during manipulation of the tool by the drive source, essentially remaining unchanged relative to a wall of the recess. Stated another way, when the drive source manipulates or otherwise moves the tool, the end of the tool operably connected to the drive source remains generally vertically above an opposite end of the tool.

As shown in FIG. 3, structure 12 includes waste-collection vessels 60, 62, an accumulator 46 and a consolidation canister 52. In one embodiment, waste-collection vessel 60 receives compressible waste, such as sleeves or portions of tubes associated with fuel assemblies 16. Waste-collection vessel 62 receives non-compressible waste, such as top nozzle assemblies 20 upon their removal from fuel assemblies 16. Accumulator 46 includes an inlet 64, a fuel rod feeder mechanism 66, an indexing conveyor 68, lateral transfer devices 70, 74 operatively connected to corresponding consolidation locations 72, 76, for receiving, arranging and consolidating fuel rods as will be discussed in additional detail below. Consolidated fuel rods at consolidation location 76 are then transported by rod gripping tool 50 (FIG. 1) to consolidation canister 52.

Figure 4:
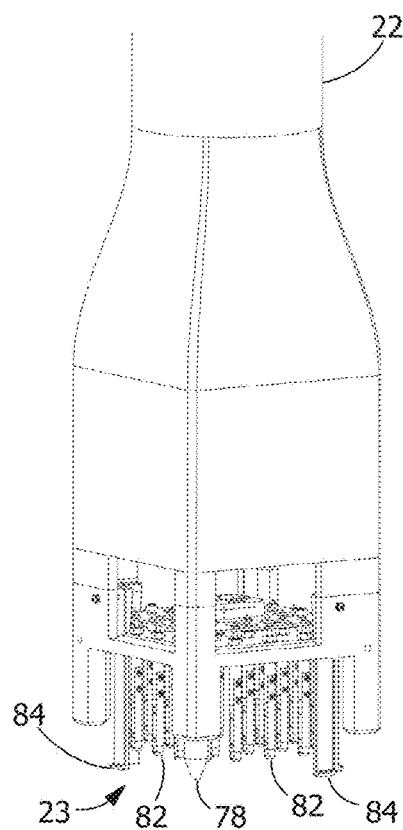
FIG. 4 is an enlarged, partial view of an exemplary top nozzle assembly removal tool of FIG. 1 according to an embodiment of the present invention.
Figure 5:
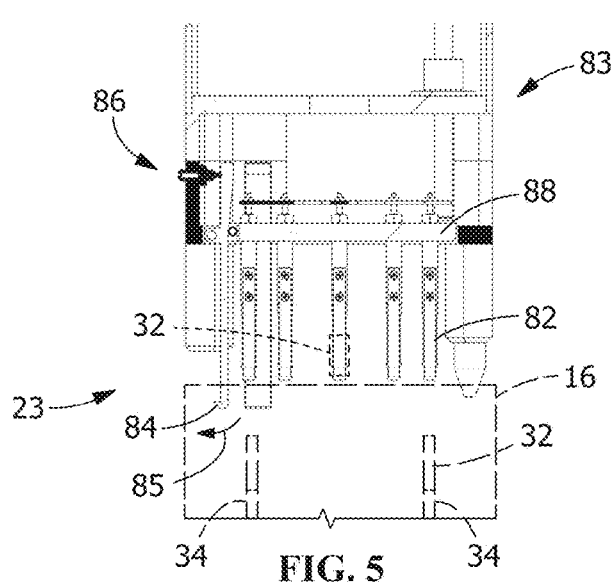
FIG. 5 is an enlarged, partial sideview of the top nozzle assembly removal tool of FIG. 4 engaging a fuel assembly according to an embodiment of the present invention.
Figure 6:
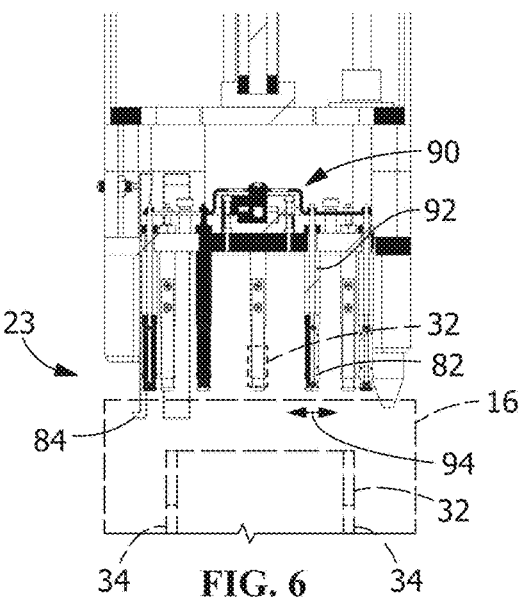
FIG. 6 is an enlarged, partial sideview of the top nozzle assembly removal tool of FIG. 4 further engaging a fuel assembly according to an embodiment of the present invention.

As shown in FIGS. 4-6, top nozzle assembly removal tool 22, which removes top nozzle assembly 20 (FIG. 3) from fuel assembly 16 (FIG. 3) is now discussed. Top nozzle assembly removal tool 22 includes an end 23 opposite the end that is operatively connected to the drive source 24 (FIG. 1). End 23 includes an engagement feature 78 which matingly engages a corresponding feature 80 (FIG. 3) of fuel assembly 16 (FIG. 3) when drive source 24 (FIG. 1) vertically aligns and then directs top nozzle assembly removal tool 22 into mating engagement with fuel assembly 16 (FIG. 3). As further shown in FIG. 5, end 23 further includes a plurality of sleeve extractors 82 that are directed inside of retaining sleeves 32 positioned inside of tubes or guide tubes 34. Retaining sleeves 32 retain top nozzle assembly 20 connection to fuel assembly 16. One or more retention hooks 84, such as four (two retention hooks 84 are shown in FIG. 4) are actuated to lockingly engage corresponding internal features (not shown) of top nozzle assembly 20. In one embodiment, ends of retention hooks 84 outwardly pivot 85 such as by using a cam mechanism 86 to engage the corresponding internal features of top nozzle assembly 20. In one embodiment, a cam mechanism 86 operates simultaneously with a drive mechanism 83 urging downward movement of a plate assembly 88 carrying sleeve extractors 82 relative to end 23, resulting in sleeve extractors 82 being inserted inside of corresponding retaining sleeves 32.

Once sleeve extractors 82 have been inserted inside of corresponding retaining sleeves 32, as shown in FIG. 6, a drive mechanism 90 actuates rods 92 to move axially relative to corresponding sleeve extractors 82 such that opposed portions of the ends of the sleeve extractors 82 laterally outward movement 94 or away from each other, resulting in the sleeve extractors 82 contacting the inner surface of the corresponding retaining sleeves 32 and thereby capturing the corresponding retaining sleeves 32. Once sleeves 32 have been captured by corresponding sleeve extractors 82, drive mechanism 90 actuates plate assembly 88 and sleeve extractors 82 away from guide tubes 34 to an intermediate position where retention hooks 84 remain engaged with the top nozzle assembly 20, permitting drive source 24 (FIG. 1) to disengage the top nozzle assembly 20 from fuel assembly 16, exposing ends of fuel rods 18 (FIG. 3) facing drive source 24.

Stated another way, as collectively shown in FIGS. 1-6, the plurality of sleeve extractors 82 are positionable between a retracted position, an intermediate position, and an extended position, and the retention hook 84 is movable between an engaged position and a disengaged position for selectively engaging and disengaging the top nozzle assembly 20. The system provides in response to the top nozzle assembly removal tool 22 and the fuel assembly 16 being brought into aligned engagement, the plurality of sleeve extractors 82 being actuated from the retracted position toward the intermediate position, the retention hook 82 being simultaneously movable from the disengaged position toward the engaged position for engaging the top nozzle assembly 20. The system provides in response to the plurality of sleeve extractors 82 being actuated from the intermediate position toward the extended position, ends of the plurality of sleeve extractors 82 are directed inside of corresponding sleeves 32, the ends of the plurality of sleeve extractors 82 being actuated radially outward for engaging inner surfaces of the corresponding sleeves 32, The system provides in response to the plurality of sleeve extractors 82 being actuated from the extended position toward the intermediate position, the corresponding sleeves 32 being removed from the fuel assembly. The system provides in response to the plurality of sleeve extractors 82 being actuated from the intermediate position toward the retracted position, the retention hook 84 being simultaneously movable from the engaged position toward the disengaged position for disengaging the top nozzle assembly 20, when the top nozzle assembly 20 is positioned vertically above waste collection vessel 62. As a result of top nozzle assembly 20 being more dense than the liquid in the recess 14 (FIG. 1), the top nozzle assembly 20 falls into waste-collection vessel 62 by virtue of gravity.

Once drive source 24 (FIG. 1) has positioned top nozzle assembly removal tool 22 over waste-collection vessel 60 (FIG. 3), drive mechanism 90 (FIG. 6) actuates rods 92 (FIG. 6) in an opposite direction, permitting the opposed ends of sleeve extractors 82 (FIG. 6) to move toward one another, thereby releasing the corresponding retaining sleeves 32 (FIG. 6). As a result of retaining sleeves 32 (FIG. 6) being more dense than the liquid in the recess 14 (FIG. 1), the retaining sleeves 32 fall into waste-collection vessel 60 by virtue of gravity. In one embodiment, end 23 (FIG. 6) of top nozzle assembly removal tool 22 (FIG. 1) includes nozzles for directing streams of liquid to ensure the retaining sleeves 32 (FIG. 6) are released from the tool.

Figure 11:
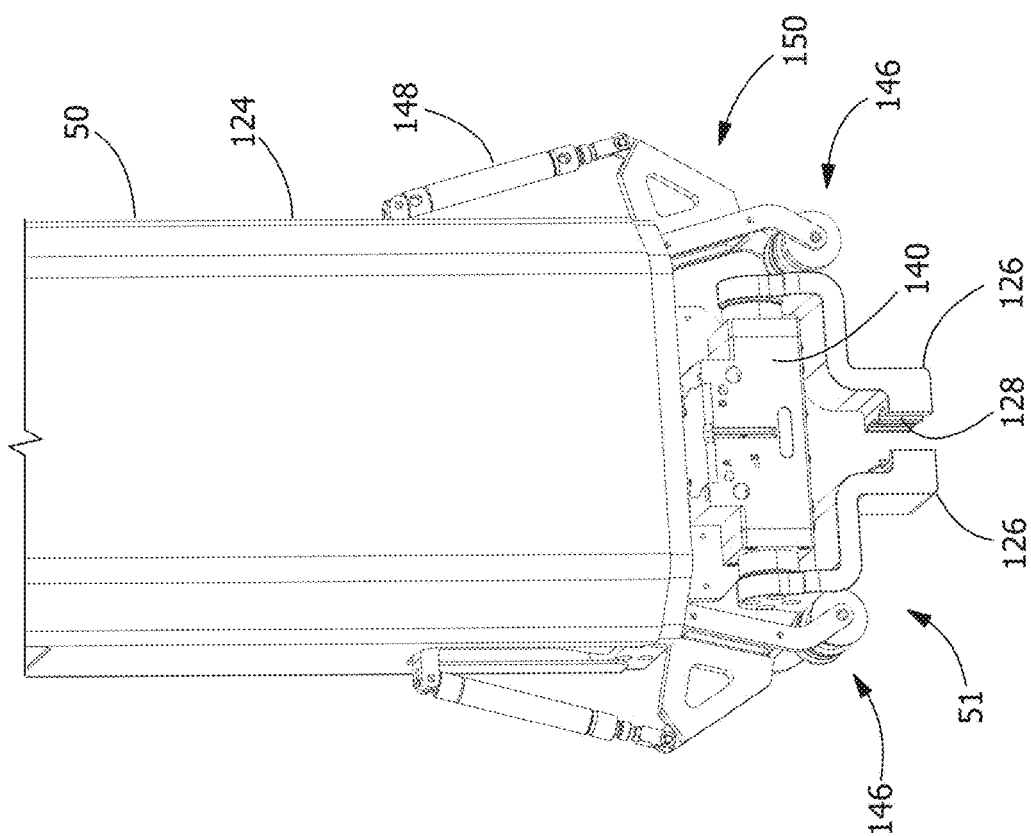
FIG. 11 is an enlarged, partial view of an exemplary tube cutter tool of FIG. 1 according to an embodiment of the present invention.

As shown in FIGS. 1 and 11, tube cutter tool 28 is now discussed. Tube cutter tool 28 includes an end 29 opposite the end that is operatively connected to the drive source 24 (FIG. 1), End 29 includes a plurality of cutters 30, with each cutter 30 including a cutter element 31 that is selectively movable between a retracted position and an extended cutting position in which cutter element 31 radially outwardly extends from the outer surface of the cutter. One or more rotary drive motors 96 (a pair of drive motors 96 are shown in FIG. 11), such as pneumatic drive motors simultaneously rotatably drive cutters 30.

In operation, drive source 24 (FIG. 1) operatively engages or is operatively connected to tube cutter tool 28 positioned in docking station 58 as previously discussed. Drive source 24 operably suspends tube cutter tool 28, vertically aligning and then inserting each cutter 30 inside of a corresponding guide tube 34 of fuel assembly 16 (FIG. 3). Once inserted in the guide tubes 34, each cutter elements 31 is urged from the retracted position to an extended cutting position by a corresponding conventional drive mechanism 98 (only one drive mechanism 98 is schematically shown in FIG. 11). As cutter elements 31 are being urged toward the extended cutting position, drive motors 96 are urged into rotational movement, thereby cutting segments 35 from corresponding guide tubes 34. By maintaining cutter elements 31 in the extended cutting position, upon removal of tube cutter tool 28 from fuel assembly 16 (FIG. 3), segments 35 are retained by their respective cutter 30. Removal of segments 35 provides sufficient access for rod extraction gripping tool 36 (FIG. 1) associated with removing fuel rods 18 (FIG. 3) from fuel assembly 16 (FIG. 3). Once end 29 of tube cutter tool 28 is vertically positioned above waste-collection vessel 60, cutter elements 31 are urged from the extended cutting position to the retracted position, thereby permitting segments 35 to fall into waste-collection vessel 60 in a manner as previously discussed with retaining sleeves 32 (FIG. 5). Tube cutter tool 28 is then returned to its respective docking station 58 (FIG. 1).

Referring to FIGS. 7-10 and 10A, rod extraction gripping tool 36 includes a frame 38 having a longitudinal axis 40 and a gripper array assembly 42 for gripping corresponding ends of a row 44 (FIG. 3) of fuel rods 18 (FIG. 3) in fuel assembly 16 (FIG. 3). In an exemplary 17×17 fuel assembly, up to 17 fuel rods 18 may be contained in row 44, although less than 17 fuel rods may be present. In one embodiment, gripper array assembly 42 may include a sufficient number of grippers 102 (FIG. 10) to accommodate rows of fuel rods in other fuel rod array arrangements that may contain less than 17 fuel rods. System 10 (FIG. 1) of the present invention has a controller such as a microprocessor that is well known. The number and position of each fuel rod in each row of fuel rods in each of the fuel assemblies is known by the system.

Gripper array assembly 42 is selectively movable along frame 38 by a pair of ball screws 100 extending along frame 38. In one embodiment, linear guide rails are used in combination with ball screws 100. In one embodiment, ball screws 100 are driven by a servo motor with position feedback sent to the control system Gripper array assembly 42 includes a plurality of grippers 102, each gripper independently having a predetermined float length 106 along axis 40 capable of gripping an end of a corresponding used nuclear fuel rod 18 (FIG. 3) of a row 44 (FIG. 3) of used nuclear fuel rods, each of the used nuclear fuel rods capable of having a length differential relative to another used nuclear fuel rod of the row of used nuclear fuel rods; the length differential equal to or less than the predetermined float length 106. Stated another way, each gripper 102 is designed with passive compliance ("float") in a vertical direction, such as with springs, to accommodate fuel rods 18 at various heights. The amount of compliance is equal to the amount of available space within the fuel assembly 16 (FIG. 3) for growth/movement, approximately 2.3 inches. In another embodiment, the amount of compliance may be greater than or less than 2.3 inches. As shown in FIG. 10A, an exemplary gripper 102 includes at least one shoulder 104 for contacting an end of a corresponding fuel rod 18 (FIG. 3). So long as the end of the fuel rod 18 falls within float length 106, gripper 102 can engage the outer surface of the corresponding fuel rod 18 for gripping/extracting the fuel rod. Each gripper 102 of gripper array assembly 42 includes a corresponding gripping mechanism 108, including an actuator 110 controlled by a controller 112 for selectively opening/closing the jaws of a respective gripper.

As further shown in FIG. 10, each gripper 102 is operatively connected to a corresponding pin 114 that is subjected to a tensile load equal to a retraction force of a corresponding used nuclear fuel rod 18 (FIG. 3) applied along axis 40. Each gripper 102 includes a sensor (not shown) such as a proximity sensor in communication with controller 112 for feedback control of the system, with force sensing being achieved via strain gauges (not shown) located on the support pin 114 that is in in communication with controller 112 for providing feedback control. In response to retraction force 116 exceeding a first predetermined force that has been input into controller 112, a signal corresponding to the exceeded retraction force is provided to a controller in a manner that is well known, resulting in the gripper 102 releasing the end of the corresponding used nuclear fuel rod 18. In one embodiment, in response to the retraction force 116 exceeding a second predetermined force, which may be equal to or different from the first predetermined force, the gripper 102 becomes slidably disengaged from the end of the corresponding used nuclear fuel rod 18. That is, the gripping force applied by each gripper 102 to the outer surface of each used nuclear fuel rod 18 may be insufficient to continue to non-movably retain (i.e., grip) the fuel rods, and would "slide off" or slidably disengage from the fuel rods without the need for adjustment of the gripping force of the grippers. In other words, the above release/disengagement capabilities of the gripper from the fuel rods are safety measures in the event one or more fuel rods are "stuck," i.e., requiring a retraction force that may damage the fuel rods. A specially configured tool (not shown) may be used to disengage such fuel rods.

As further shown in FIGS. 7 and 8, rod extraction gripping tool 36 includes at least one pair of opposed guide rollers 118 (four pair of opposed guide rollers 118 are shown in FIG. 7) for guiding the row 44 (FIG. 3) of used nuclear fuel rods 18 (FIG. 3) along axis 40 relative to the frame 38 during removal of the row 44 of used nuclear fuel rods 18 from the fuel assembly 16 (FIG. 3). As shown in FIG. 8, each guide roller 118 includes a linkage 122 that is pivotably connected to an actuator 120 such as a pneumatic cylinder, thereby permitting the guide rollers 118 to be rotated out of the path of gripper array assembly 42 (retracted position) during operation of rod extraction gripping tool 36, then permitting the guide rollers 118 to be brought together (engaged position) to guide and support the row 44 (FIG. 3) of used nuclear fuel rods 18 (FIG. 3) while being collected by and removed from rod extraction gripping tool 36.

Figure 12:
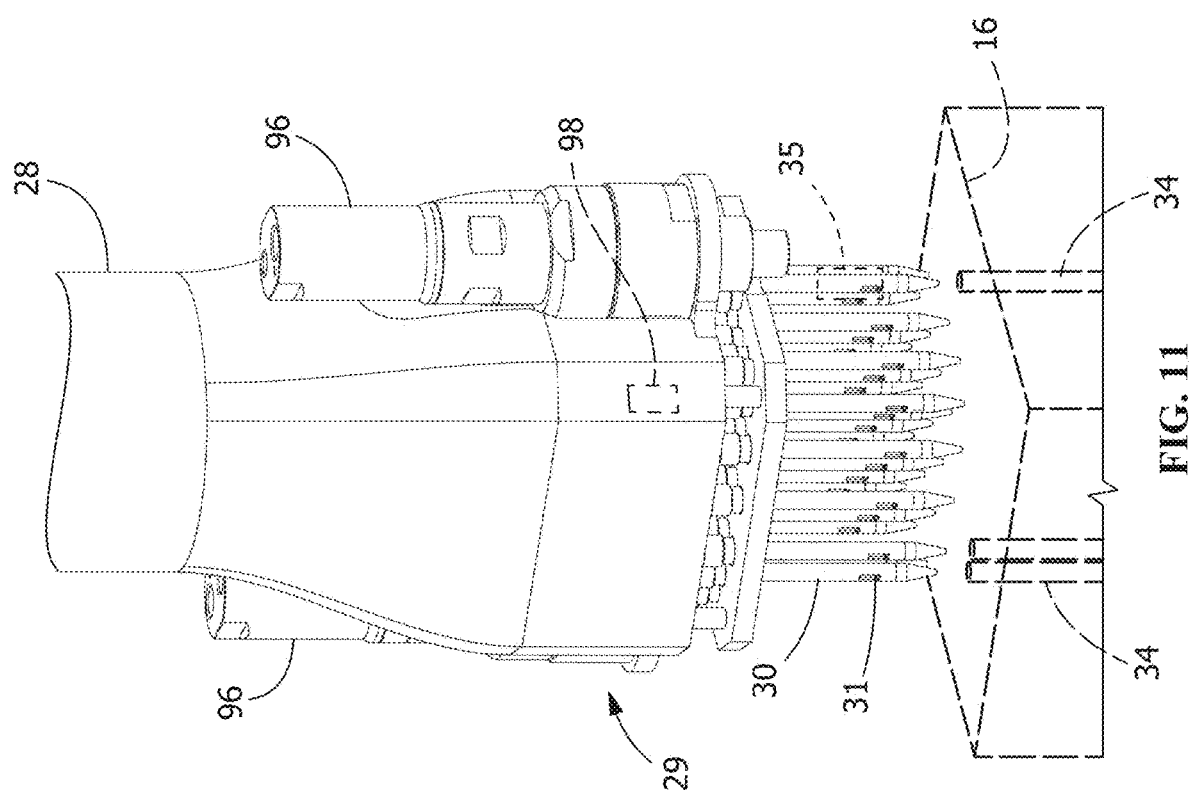
FIG. 12 is an enlarged, partial view of an exemplary rod gripping tool according to an embodiment of the present invention.
Figure 19:
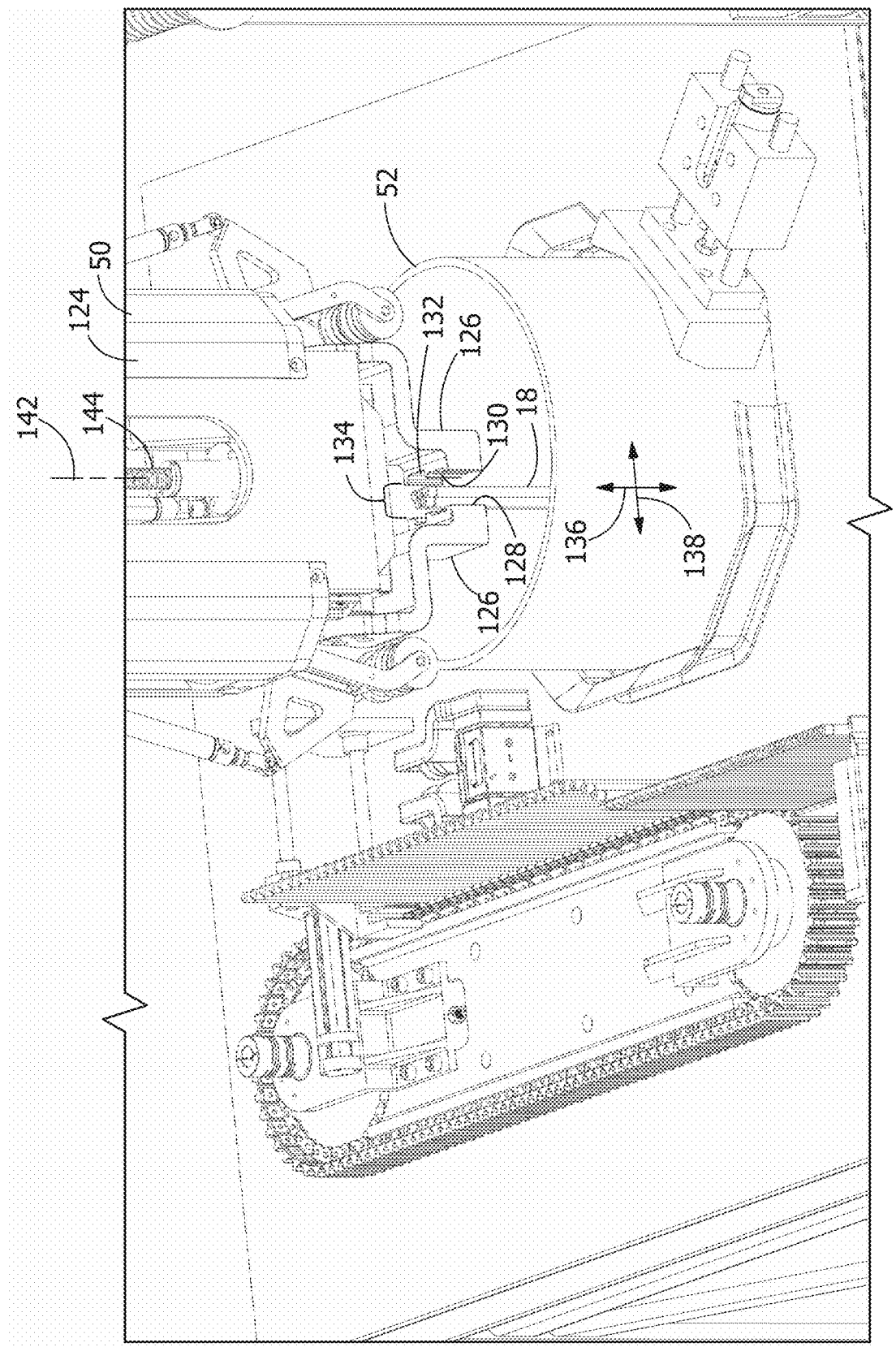
FIG. 19 is an upper perspective view of an arrangement of used nuclear fuel rods being placed in a consolidation canister according to an embodiment of the present invention.

Referring to FIGS. 1 and 12, rod gripping tool 50 includes an elongated frame 124 having a pair of gripping jaws or grippers 126 having corresponding gripping features 128 capable of selectively gripping one or more fuel rods 18 (FIG. 3), such as up to five fuel rods. In one embodiment, the gripping features are capable of gripping more than five fuel rods. As shown in FIG. 19, gripping features 128 includes a first portion 130 capable of gripping any combination of one, two or three fuel rods 18. Gripping features 128 also includes a second portion 132 adapted to grip a predetermined arrangement 134 of fuel rods 18, such as a row of three fuel rods in close proximity to a nested row of two fuel rods collectively defining a generally trapezoidal footprint, which predetermined arrangement 134 of fuel rods 18 having been consolidated to remove spacing between adjacent fuel rods in transverse directions 136, 138 such that the predetermined arrangement 134 of fuel rods is considered "nested." An actuator 140, having a drive motor (not shown), such as a pneumatic parallel gripper actuator, that is adapted to drivingly move the pair of grippers 126 toward one another or away from one another to selectively engage and grip or selectively disengage predetermined arrangement 134 of fuel rods 18. Grippers 126 are selectively movable along a longitudinal axis 142 of frame 124 by a conventional drive mechanism, such as a ball screw 144 with linear guide rails (not shown).

As shown in FIGS. 12 and 19, rod gripping tool 50 includes at least one pair of opposed guide rollers 146 in proximity to end 51 (FIG. 12) for guiding predetermined arrangement 134 of (FIG. 19) fuel rods along axis 142 (FIG. 19) relative to frame 124 during engagement (gripping)/disengagement of predetermined arrangement 134 of used nuclear fuel rods by/from the pair of grippers 126. As further shown in FIG. 12, each guide roller 146 includes a linkage 150 that is pivotably connected to an actuator 148 such as a pneumatic cylinder, thereby permitting the guide rollers 146 to be rotated out of the path of the gripper assembly during operation of rod gripping tool 50, then permitting the guide rollers 146 to be brought together (engaged position) to guide and support the predetermined arrangement (FIG. 19) of used nuclear fuel rods 18 (FIG. 3).

Returning to FIG. 3, accumulator 46 is now discussed. FIG. 3 is a plan view of accumulator 46, with FIG. 13 being an upper perspective view of accumulator 46. As further shown in FIG. 13, once row 44 of fuel rods has been collected by rod extraction gripping tool 36, drive source 24 (FIG. 1) suspendedly aligns and matingly engages engagement features 154 of rod extraction gripping tool 36 with corresponding engagement features 156 of accumulator inlet 64. Once engaged, gripper array assembly 42 (FIG. 7) is directed along axis 40 (FIG. 7) of rod extraction gripping tool 36 for feeding or inserting row 44 of fuel rods into accumulator inlet 64 that is received by a fuel rod feeder mechanism 66. Once gripper array assembly 42 (FIG. 7) releases the row 44 of fuel rods into the accumulator inlet 64, drive source 24 (FIG. 1) suspendedly moves rod extraction gripping tool 36 to fuel assembly 16 (FIG. 3) to collect another row of fuel rods.

Figure 13:
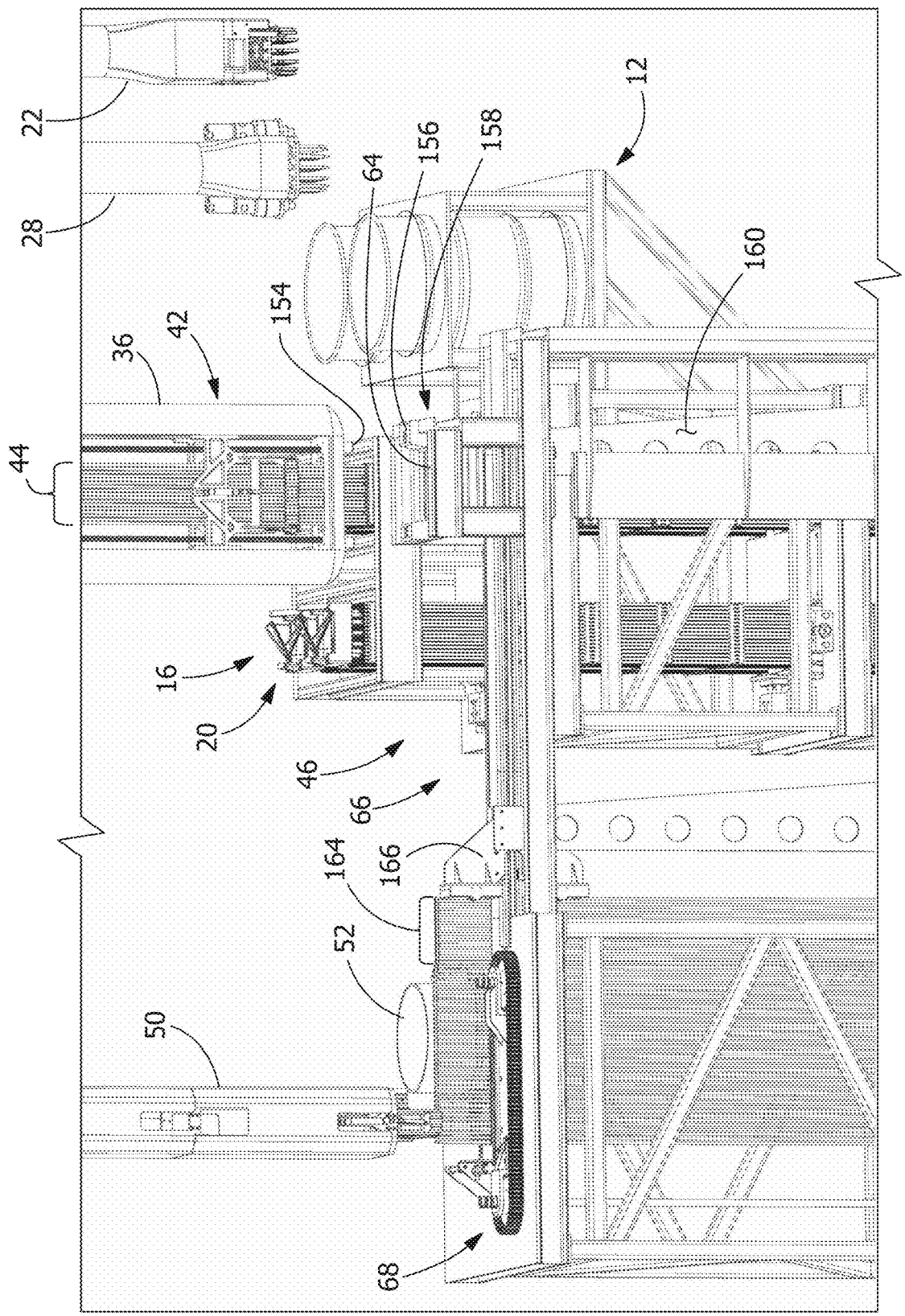
FIG. 13 is an enlarged view of the exemplary accumulator of FIG. 1 according to an embodiment of the present invention.
Figure 14:
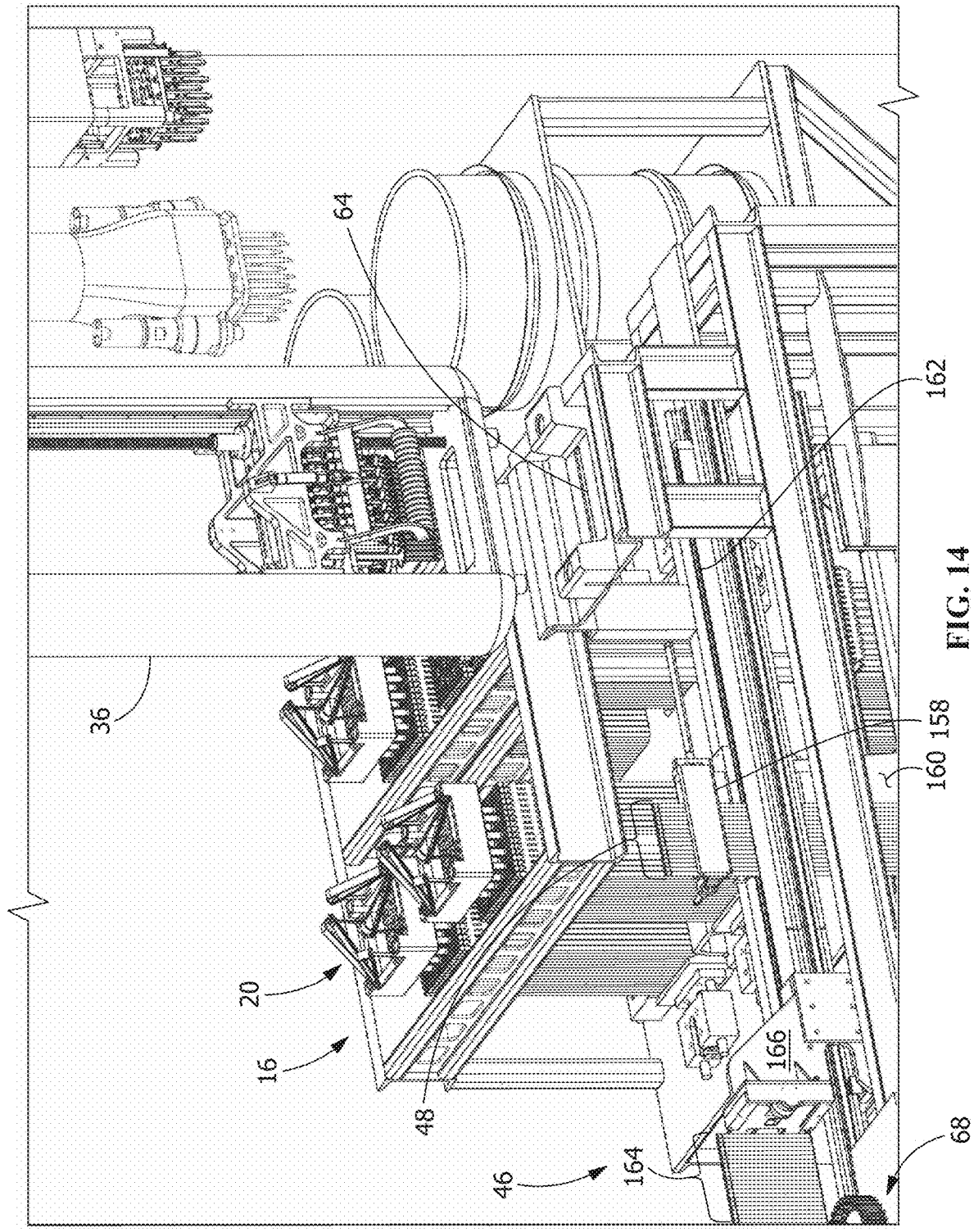
FIG. 14 shows a carriage laterally translating or moving laterally compressed row along a slot toward an indexing conveyor—according to an embodiment of the present invention.
Figure 15:
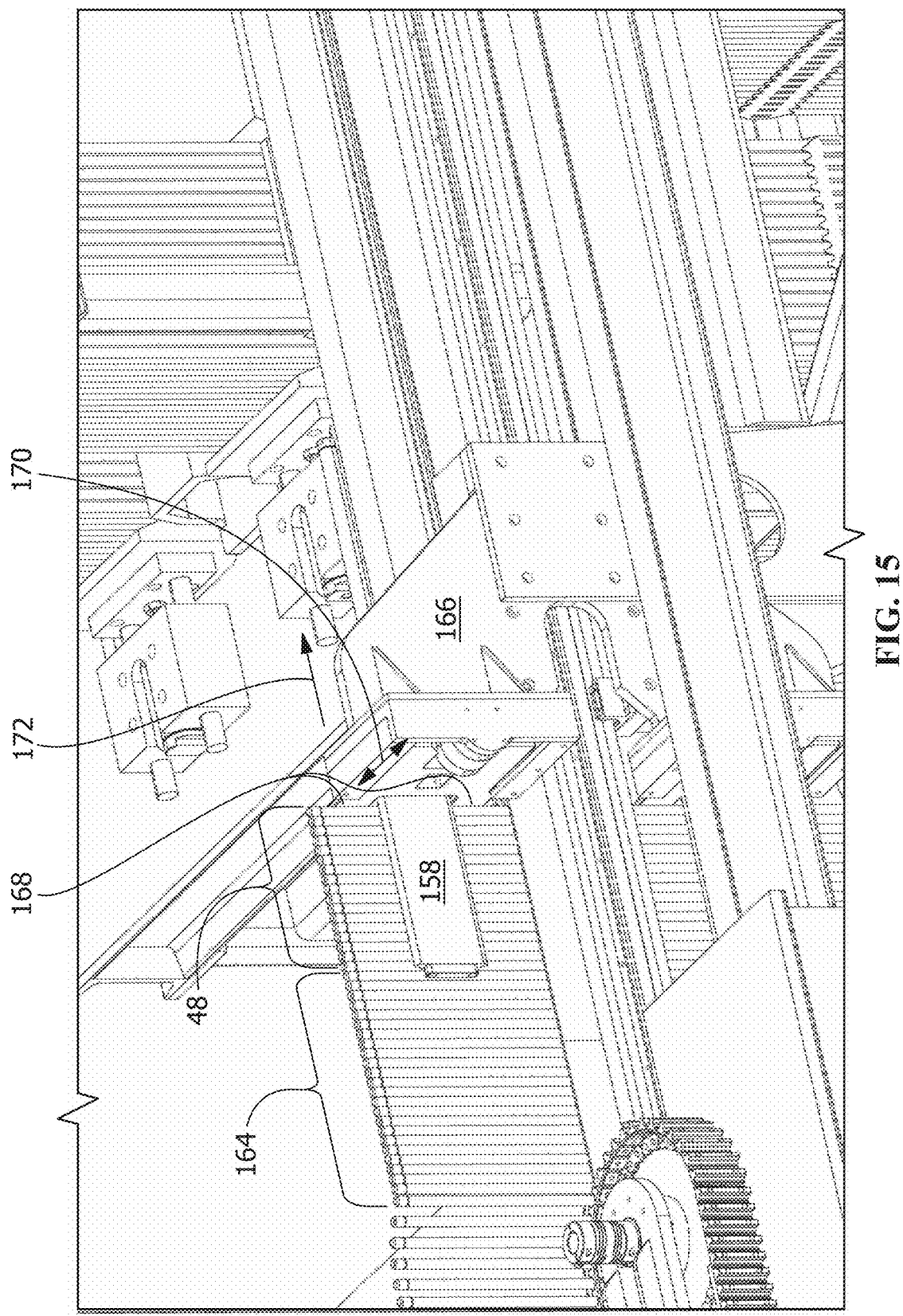
FIG. 15 shows fingers 168 of the feed mechanism moving in a transverse direction away from previously laterally compressed fuel rods, followed by feed mechanism moving in travel direction until past laterally compressed row according to an embodiment of the present invention.
Figure 16:
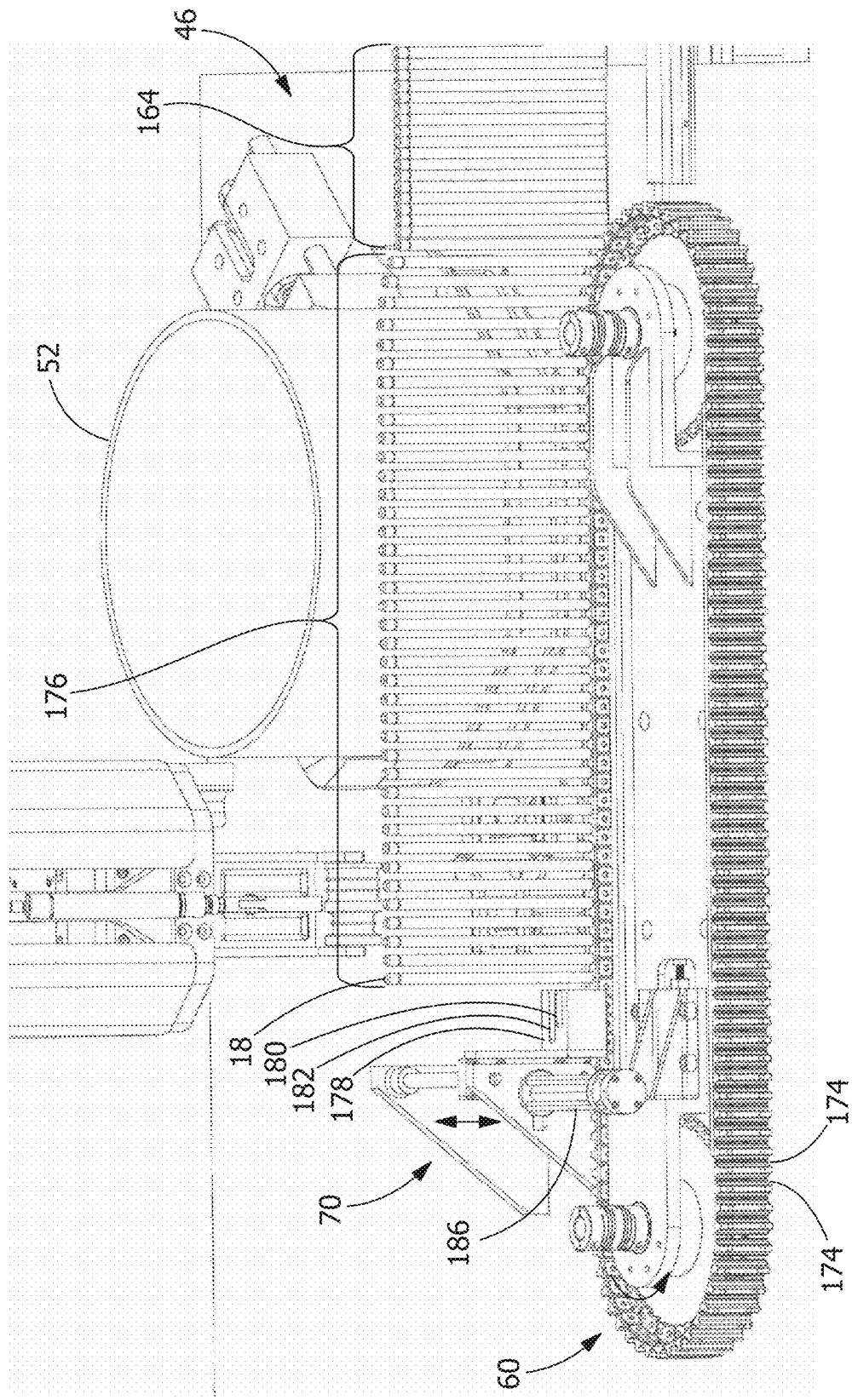
FIG. 16 shows a lateral transfer device in a position ready to accept a predetermined number of laterally spaced fuel rods according to an embodiment of the present invention.

As shown in FIGS. 13-15, fuel rod feeder mechanism 66 includes a shoe or carriage 158 supported by an elongated arm 160, which row 44 of fuel rods being laterally compressed in carriage 158, becoming a laterally compressed row 48 (FIG. 14). FIGS. 14-18 show the sequential steps in the operation of the accumulator 46. FIG. 14 shows carriage 158 laterally translating or moving laterally compressed row 48 along a slot 162 (FIG. 14) toward an indexing conveyor 68. As shown in FIGS. 13 and 14, previously laterally compressed fuel rods 164 are positioned in slot 162 (FIG. 14) between indexing conveyor 68 and laterally compressed row 48 (FIG. 14). Previously laterally compressed fuel rods 164 are secured opposite of indexing conveyor 68 by a feed mechanism 166. Once carriage 158 laterally translates laterally compressed row 48 of fuel rods into contact with previously laterally compressed fuel rods 164, fingers 168 (FIG. 15) of feed mechanism 166 move in a transverse direction 170 away from previously laterally compressed fuel rods 164, followed by feed mechanism 166 moving in travel direction 172 until past laterally compressed row 48, whereupon fingers 168 are moved in transverse direction 170 toward laterally compressed row 48, thereby securing laterally compressed row 48 of fuel rods against previously laterally compressed fuel rods 168. As shown in FIG. 16, previously laterally compressed fuel rods 164 are fed into adjacent recesses 174 of indexing conveyor 68 rotatably driven by a motor (not shown), becoming laterally spaced fuel rods 176.

Figure 17:
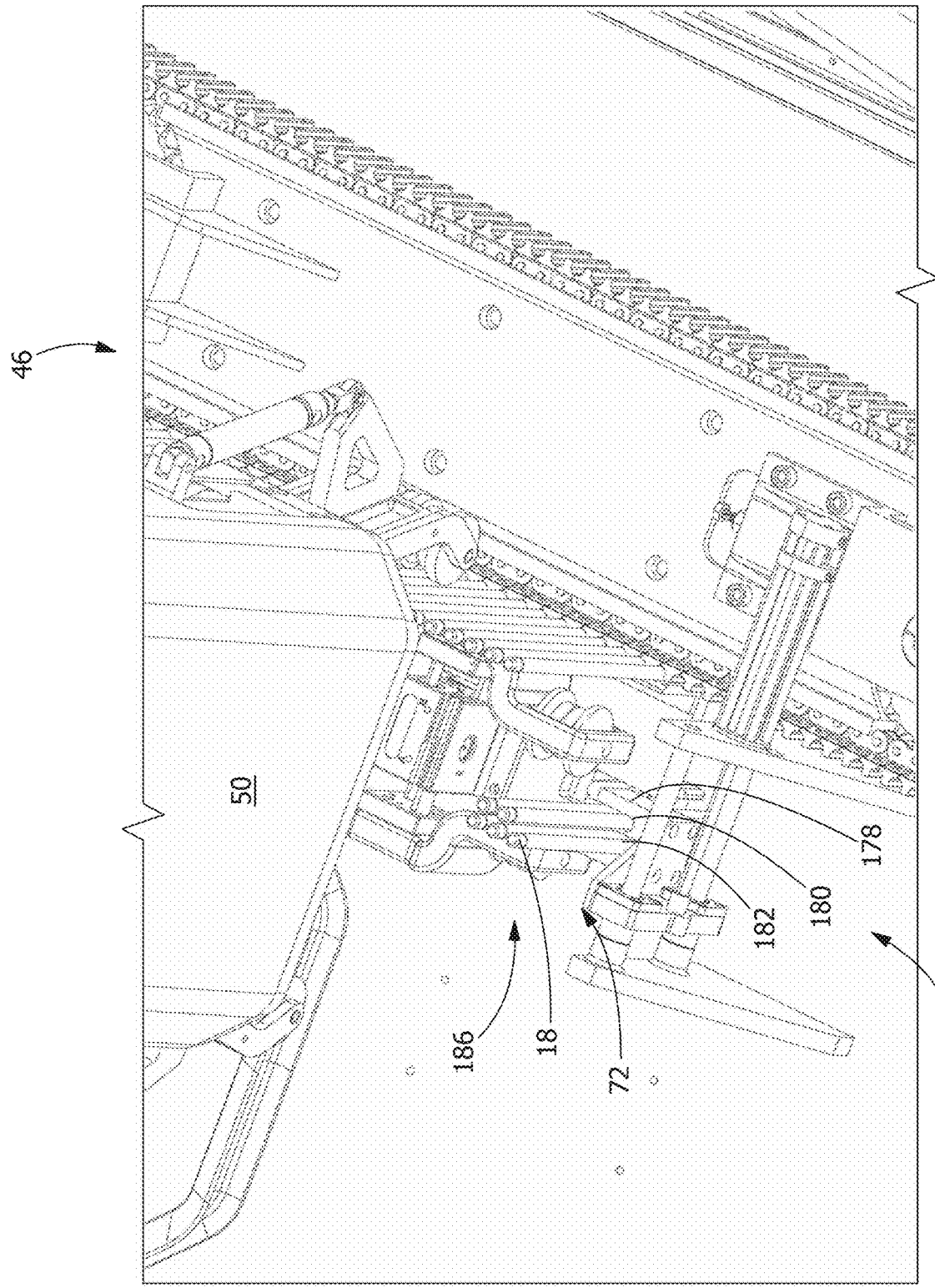
FIG. 17 shows a lateral transfer device laterally transporting a predetermined arrangement of fuel rods to the consolidation location according to an embodiment of the present invention.

FIGS. 16 and 17 show a lateral transfer device 70 extending in a direction perpendicular to laterally spaced fuel rods 176. In FIG. 16, the lateral transfer device 70 is shown in a position ready to accept a predetermined number of laterally spaced fuel rods 176. A motor (not shown) cooperatively moves slots 180, 182 of fitting 178 in a direction transverse to laterally spaced fuel rods 176, to collect a predetermined number of laterally spaced fuel rods 176 from the indexing conveyor 68 in slots 180, 182, forming a predetermined arrangement 186 (FIG. 17) of fuel rods. In FIG. 17, the lateral transfer device 70 is shown laterally transporting a predetermined arrangement 186 of fuel rods 18 to the consolidation location 72. As shown in FIGS. 16 and 17, a lateral transfer device 70 includes a fitting 178 having a pair of slots 180, 182 extending in a direction parallel to laterally spaced fuel rods 176. For example, as shown in FIG. 17, slot 180 contains a pair of fuel rods 18 and slot 182 contains three fuel rods 18. In one embodiment, as few as one total fuel rod may be contained one or both of slots 180, 182, as needed to efficiently fill a consolidation canister 52. Lateral transfer device 70 laterally transports the predetermined arrangement 186 of fuel rods to consolidation location 72 for laterally compressing adjacent corresponding portions, i.e., the fuel rods contained in slots 180 and 182, of the predetermined arrangement 186 of fuel rods in a direction 172 (FIG. 15) which is parallel to the direction of movement of used nuclear fuel rods in the fuel rod feeder mechanism 66 (FIG. 13).

Figure 18:
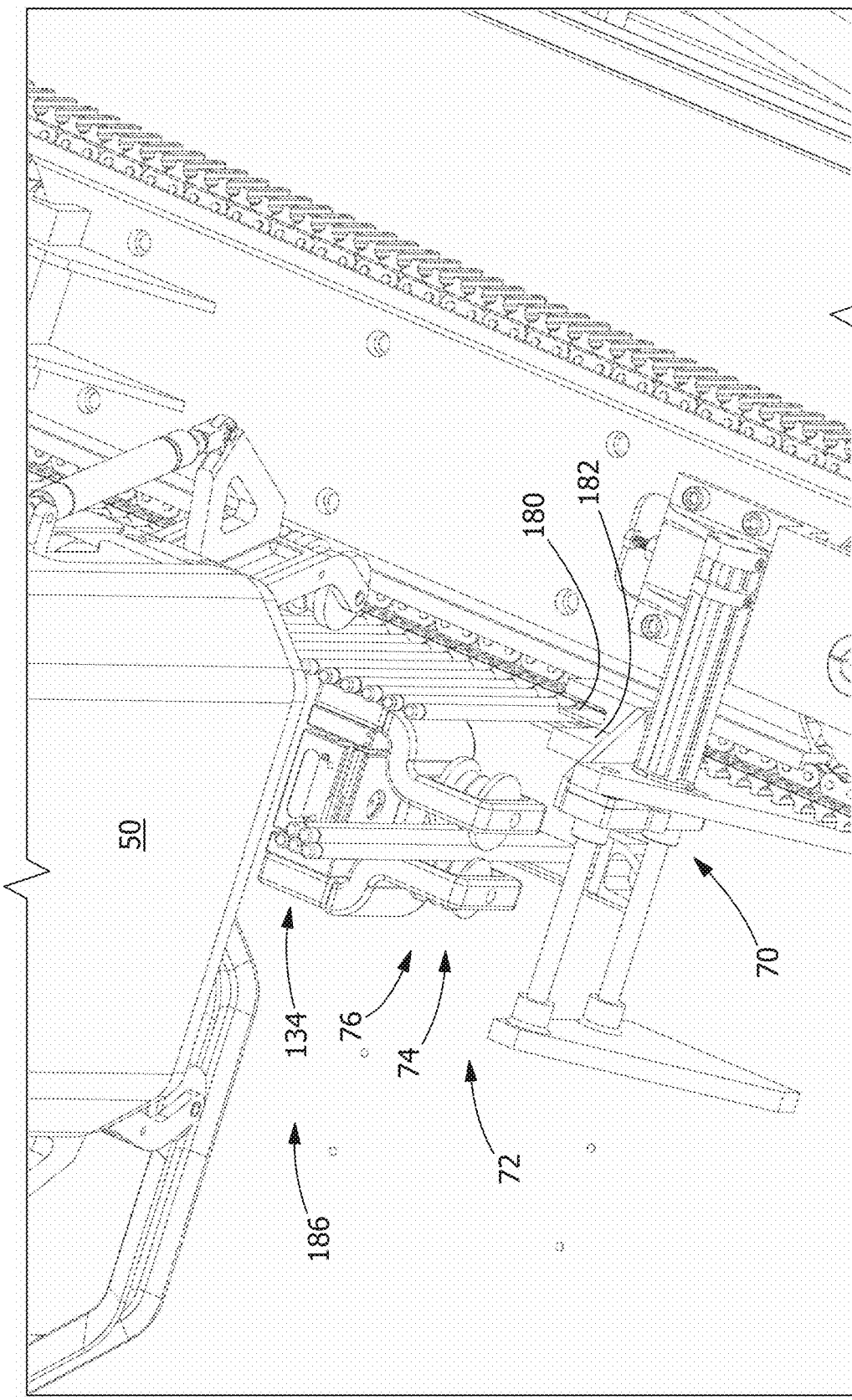
FIG. 18 shows when a transfer device transports a predetermined arrangement of fuel rods from consolidation location to a consolidation location according to an embodiment of the present invention.

As shown in FIG. 18, a transfer device 74 transports predetermined arrangement 186 of fuel rods from consolidation location 72 to a consolidation location 76. Lateral transfer device 74 laterally compresses adjacent corresponding portions, i.e., the two fuel rods formerly contained in slot 180 and the three fuel rods formerly contained in slot 182 of lateral transfer device 70, of the predetermined arrangement 186 of fuel rods in a direction 170 (FIG. 15) that is transverse to a direction of movement of fuel rods in the fuel rod feeder mechanism 66 (FIG. 13). As a result of this lateral compression in both mutually transverse directions 170, 172 (FIG. 15), predetermined arrangement 186 of fuel rods becomes predetermined arrangement 134 of fuel rods collectively defining a generally trapezoidal footprint, such that the predetermined arrangement 134 of fuel rods is considered "nested" as previously discussed.

A method for consolidating used nuclear fuel comprises securing structure 12 in a recess 14 adjacent fuel assembly 16 containing used nuclear fuel rods 18 therein. The method provides fuel assembly 16 having a top nozzle assembly 20. The method further provides suspendably removing top nozzle assembly 20 from fuel assembly 16 with an elongated top nozzle assembly removal tool 22, exposing ends of the used nuclear fuel rods 18. The method further provides suspendably cutting and removing a predetermined segment 35 of corresponding tubes 34 in fuel assembly 16 with an elongated tube cutter tool 28 having a plurality of cutters 30. The method further provides suspendably removing a row 44 of used nuclear fuel rods 18 from fuel assembly 16 with an elongated rod extraction gripping tool 36. The method further provides selectively laterally arranging the row 44 of used nuclear fuel rods 18 in an accumulator 46, and suspendably moving the selectively laterally arranged used nuclear fuel rods 18 from the accumulator 46 to a consolidation canister 52 for receiving the selectively laterally arranged used nuclear fuel rods 18 therein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for consolidating used nuclear fuel, comprising:
   a structure securable in a recess for supporting a fuel assembly containing used nuclear fuel rods, the fuel assembly having a top nozzle assembly;
   an elongated top nozzle assembly removal tool operably suspendable from a drive source for removing the top nozzle assembly from the fuel assembly, exposing ends of the used nuclear fuel rods facing the drive source, wherein the top nozzle assembly removal tool includes a plurality of sleeve extractors for extracting corresponding retaining sleeves in the fuel assembly;
   an elongated tube cutter tool having a plurality of cutters operably suspendable from the drive source for cutting and removing a predetermined segment of corresponding tubes in the fuel assembly; an elongated rod extraction gripping tool having a frame having a longitudinal axis and a gripper array assembly selectively movable along the axis relative to the frame for selectively engaging ends of one or more used nuclear fuel rods arranged in a row, the rod extraction gripping tool operably suspendable from the drive source for removing the one or more used nuclear fuel rods from the fuel assembly to form a row of removed used nuclear fuel rods;

an accumulator for selectively laterally arranging the row of removed used nuclear fuel rods therein; and an elongated second rod gripping tool operably suspendable from the drive source for moving at least one used nuclear fuel rod of the selectively laterally arranged row of used nuclear fuel rods from the accumulator to a consolidation canister for receiving the at least one used nuclear fuel rod therein.

2. The system of claim 1, wherein the system is configured to maintain a predetermined vertical separation from a reference surface in the recess at all times during movement of the used nuclear fuel rods from the fuel assembly to the consolidation canister.

3. The system of claim 1, wherein the top nozzle assembly removal tool includes a retention hook for selectively engaging the fuel assembly.

4. The system of claim 3, wherein the plurality of sleeve extractors are positionable between a retracted position, an intermediate position, and an extended position, and the retention hook is movable between an engaged position and a disengaged position for selectively engaging and disengaging the fuel assembly;

wherein in response to bringing the top nozzle assembly removal tool into aligned engagement with the fuel assembly, the plurality of sleeve extractors are actuated from the retracted position toward the intermediate position, and the retention hook is simultaneously moved from the disengaged position toward the engaged position for engaging the fuel assembly;

wherein in response to actuating the plurality of sleeve extractors from the intermediate position toward the extended position, ends of the plurality of sleeve extractors are directed inside of corresponding sleeves and the ends of the plurality of sleeve extractors are actuated radially outward to engage inner surfaces of the corresponding sleeves; wherein in response to the plurality of sleeve extractors being actuated from the extended position toward the intermediate position, the corresponding sleeves being removed from the fuel assembly; and wherein in response to actuating the plurality of sleeve extractors from the intermediate position toward the retracted position, the retention hook is simultaneously moved from the engaged position toward the disengaged position for disengaging the fuel assembly.

5. The system of claim 4, wherein the retention hook is pivotably movable between the engaged position and the disengaged position.

6. The system of claim 1, wherein each of the plurality of cutters has a cutter element that moves radially outward from a retracted position to an extended cutting position.

7. The system of claim 1, wherein the gripper array assembly has a plurality of grippers and each gripper independently has a predetermined float length along the axis capable of gripping an end of a corresponding used nuclear fuel rod row, each of the used nuclear fuel rods of each of the used nuclear fuel rod rows capable of having a length differential relative to another used nuclear fuel rod of the used nuclear fuel rod row from which the used nuclear fuel rod is a member thereof, the length differential equal to or less than the predetermined float length.

8. The system of claim 7, wherein each gripper is operatively connected to a corresponding pin, the pin being subjected to a tensile load equal to a retraction force of a corresponding used nuclear fuel rod applied along the axis;

wherein in response to the retraction force exceeding a first predetermined force, a signal corresponding to the exceeded retraction force is provided to a controller, resulting in the gripper releasing the end of the corresponding used nuclear fuel rod.

9. The system of claim 8, wherein in response to the retraction force exceeding a second predetermined force, the gripper becomes slidably disengaged from the end of the corresponding used nuclear fuel rod.

10. The system of claim 1, wherein the gripper array assembly is movable along the axis relative to the frame by a pair of ball screws.

11. The system of claim 1, wherein the frame of the rod extraction gripping tool includes a pair of opposed guide rollers for guiding the row of used nuclear fuel rods along the axis relative to the frame during removal of the row of used nuclear fuel rods from the fuel assembly.

12. The system of claim 11, wherein each guide roller of the pair guide rollers is selectively movable between an engaged position and a retracted position.

13. The system of claim 12, wherein each guide roller is pivotably connected to a linkage operatively connected to an actuator movable between a first position and a second position.

14. The system of claim 1, wherein the accumulator includes an intake operatively connected to a fuel rod feeder mechanism for laterally compressing adjacent used nuclear fuel rods of the row of used nuclear fuel rods.

15. The system of claim 14, wherein the fuel rod feeder mechanism moves the laterally compressed row of used nuclear fuel rods toward an indexing conveyor.

16. The system of claim 15, wherein a first lateral transfer device collects a predetermined number of used nuclear fuel rods from the indexing conveyor, forming a predetermined arrangement of used nuclear fuel rods, the first lateral transfer device transporting the predetermined arrangement of used nuclear fuel rods to a first consolidation location for laterally compressing adjacent corresponding portions of the predetermined arrangement of used nuclear fuel rods in a direction parallel to a direction of movement of used nuclear fuel rods in the fuel rod feeder mechanism.

17. The system of claim 16, wherein a second lateral transfer device transports the predetermined arrangement of used nuclear fuel rods from the first consolidation location to a second consolidation location, the second lateral transfer device laterally compressing adjacent corresponding portions of the predetermined arrangement of used nuclear fuel rods in a direction transverse to a direction of movement of used nuclear fuel rods in the fuel rod feeder mechanism.

* * * * *